United States Patent
Harms et al.

(10) Patent No.: US 11,480,066 B2
(45) Date of Patent: Oct. 25, 2022

(54) TURBINE CLUTCH CONTROL PROCESS

(71) Applicants: Energy Services LLC, Glastonbury, CT (US); Mitsubishi Power Aero LLC, Glastonbury, CT (US)

(72) Inventors: William Harms, Newton, MA (US); John J. Henderson, West Hartford, CT (US); Anthony Maiorana, Glastonbury, CT (US); Ralph David Turley, Durham, CT (US)

(73) Assignee: Energy Services LLC, Glastonbury, CT (US)

( * ) Notice: Subject to any disclaimer, the term of this patent is extended or adjusted under 35 U.S.C. 154(b) by 187 days.

(21) Appl. No.: 16/937,126

(22) Filed: Jul. 23, 2020

(65) Prior Publication Data
US 2022/0025778 A1    Jan. 27, 2022

(51) Int. Cl.
  $F01D\ 15/10$ (2006.01)
  $F02C\ 7/36$ (2006.01)
  $F02C\ 9/28$ (2006.01)
  $F02C\ 3/10$ (2006.01)
  $F02C\ 6/02$ (2006.01)

(52) U.S. Cl.
  CPC ............... *F01D 15/10* (2013.01); *F02C 3/10* (2013.01); *F02C 6/02* (2013.01); *F02C 7/36* (2013.01); *F02C 9/28* (2013.01); *F05D 2220/76* (2013.01); *F05D 2260/40* (2013.01); *F05D 2270/02* (2013.01); *F05D 2270/061* (2013.01); *F05D 2270/304* (2013.01); *F05D 2270/40* (2013.01)

(58) Field of Classification Search
  CPC .... F01D 15/10; F02C 3/10; F02C 6/02; F02C 7/36; F02C 9/28; F05D 2220/76; F05D 2260/40; F05D 2270/02; F05D 2270/061; F05D 2270/304; F05D 2270/40; F05D 2260/4023
  See application file for complete search history.

(56) References Cited

U.S. PATENT DOCUMENTS

| 6,140,803 | A  | * | 10/2000 | Hurley  | H02P 9/10 322/29 |
| 6,278,262 | B1 | * | 8/2001  | Ullyott | H02J 3/42 322/38 |
| 9,777,638 | B2 |   | 10/2017 | Freidl  |                  |

(Continued)

*Primary Examiner* — Gerald L Sung
*Assistant Examiner* — Rene D Ford
(74) *Attorney, Agent, or Firm* — Schwegman Lundberg & Woessner, P.A.

(57) ABSTRACT

A gas turbine power plant comprises a gas turbine, a power turbine, a clutch, an electrical generator and a controller. The power turbine is fluidly connected to the gas turbine without any mechanical connection. The clutch comprises an input mechanically connected to the power turbine and an output mechanically connected to the electric generator. The controller can identify that a speed of the electric generator is greater than a speed of the power turbine, determine a difference between the speed of the electric generator and the power turbine, in response to the difference being greater than a threshold, control the gas turbine to a first maximum acceleration of the power turbine, and in response to the difference being equal or less than to the threshold, control the gas turbine to a second maximum acceleration of the power turbine that is less than the first maximum acceleration.

20 Claims, 5 Drawing Sheets

(56) References Cited

U.S. PATENT DOCUMENTS

| | | | |
|---|---|---|---|
| 2015/0059347 A1* | 3/2015 | Clayton | F01K 23/101 60/772 |
| 2015/0152783 A1* | 6/2015 | Acquisti | F02C 7/36 60/39.15 |
| 2017/0226932 A1* | 8/2017 | Freidl | F01D 15/10 |
| 2018/0142741 A1 | 5/2018 | Sethi | |
| 2018/0298777 A1* | 10/2018 | Nguyen | F02C 7/32 |

* cited by examiner

TURBINE CLUTCH CONTROL PROCESS

TECHNICAL FIELD

This document pertains generally, but not by way of limitation, to power generation equipment, such gas turbine engines that can be used to drive electrical generators. More specifically, but not by way of limitation, the present application relates to clutches used to connect various combinations of two or more gas turbine engines, power turbines and electrical generators.

BACKGROUND

Gas turbine power plants may include a power turbine driven by a gas turbine engine, to provide mechanical energy to an electrical generator to generate electricity. To obtain increased power output, some power plants can include two turbines connected to one electrical generator. In some instances, the electrical generator can be used as a synchronous condenser to generate or absorb reactive power on the electrical grid, without the need of the gas turbine. When operating as a synchronous condenser, it can be desirable to utilize a clutch to decouple the electrical generator from mechanical and aerodynamic drag that can be generated by rotation of the gas turbine, which would be driven by the generator under synchronous condenser operation. It can further be desirable to use a clutch to decouple one of two gas turbines connected to a single electrical generator to reduce drag at periods that require production of power corresponding to only one gas turbine.

OVERVIEW

Problems to be solved in operating power generation equipment include overloading of clutches. The present inventors have recognized that, some prior art clutches often include external lubrication or coolant means to enhance durability, which can incur extra expense in installing and maintaining. Operational use of a compact clutch, absent any external lubrication or cooling means and connected entirely inline (absent any mounting/supporting pedestal, control, cooling, or lubrication supply) between a free turbine (also referred to as a power turbine) and an electrical generator, can overload the clutch and exceed torque transmission capacities during clutch engagement.

The present inventors have further recognized that it would be desirable to reduce wear on gas turbine clutches without the need for expensive external cooling equipment or mounting equipment. The present inventors have recognized that such problems can be mitigated by controlling ramp up speeds of a power turbine when engaging a clutch connecting the power turbine to a generator, such as while the generator is operating as a condenser. Thus, the present inventors have developed a gas turbine control scheme or process that can manage ramp rate of a free power turbine based on speed differential between the power turbine and the electrical generator.

In an example, a gas turbine power plant can comprise a first gas turbine, a first power turbine, a first clutch, an electric generator and a controller. The first power turbine can be fluidly connected to the first gas turbine absent mechanical connection to the first gas turbine. The first clutch can have an input and output, and the first clutch can be configured to disengage in response to a rotational speed of the input being less than a rotational speed of the output and to mechanically couple the input and output in response to the rotational speed of the input being equal to the rotational speed of the output. The input can be mechanically connected to the power turbine. The electric generator can be mechanically connected to the output. The controller can be configured to identify that a rotational speed of the electric generator is greater than a rotational speed of the first power turbine, determine a difference between the rotational speed of the electric generator and the first power turbine, in response to the difference being greater than a threshold, control the first gas turbine to a first maximum acceleration of the first power turbine, and in response to the difference being equal or less than to the threshold, control the first gas turbine to a second maximum acceleration of the first power turbine, the second maximum acceleration less than the first maximum acceleration.

In another example, a method for coupling a power turbine to a rotating generator in a gas turbine power plant can comprise operating the generator such that the generator is rotating at a generator speed, operating a gas turbine engine from a speed that is slower than the generator speed, ramping up the power turbine speed to within a threshold of the generator speed, and engaging a clutch configured to couple the power turbine and the generator.

This overview is intended to provide an overview of subject matter of the present patent application. It is not intended to provide an exclusive or exhaustive explanation of the invention. The detailed description is included to provide further information about the present patent application.

Figure 1:
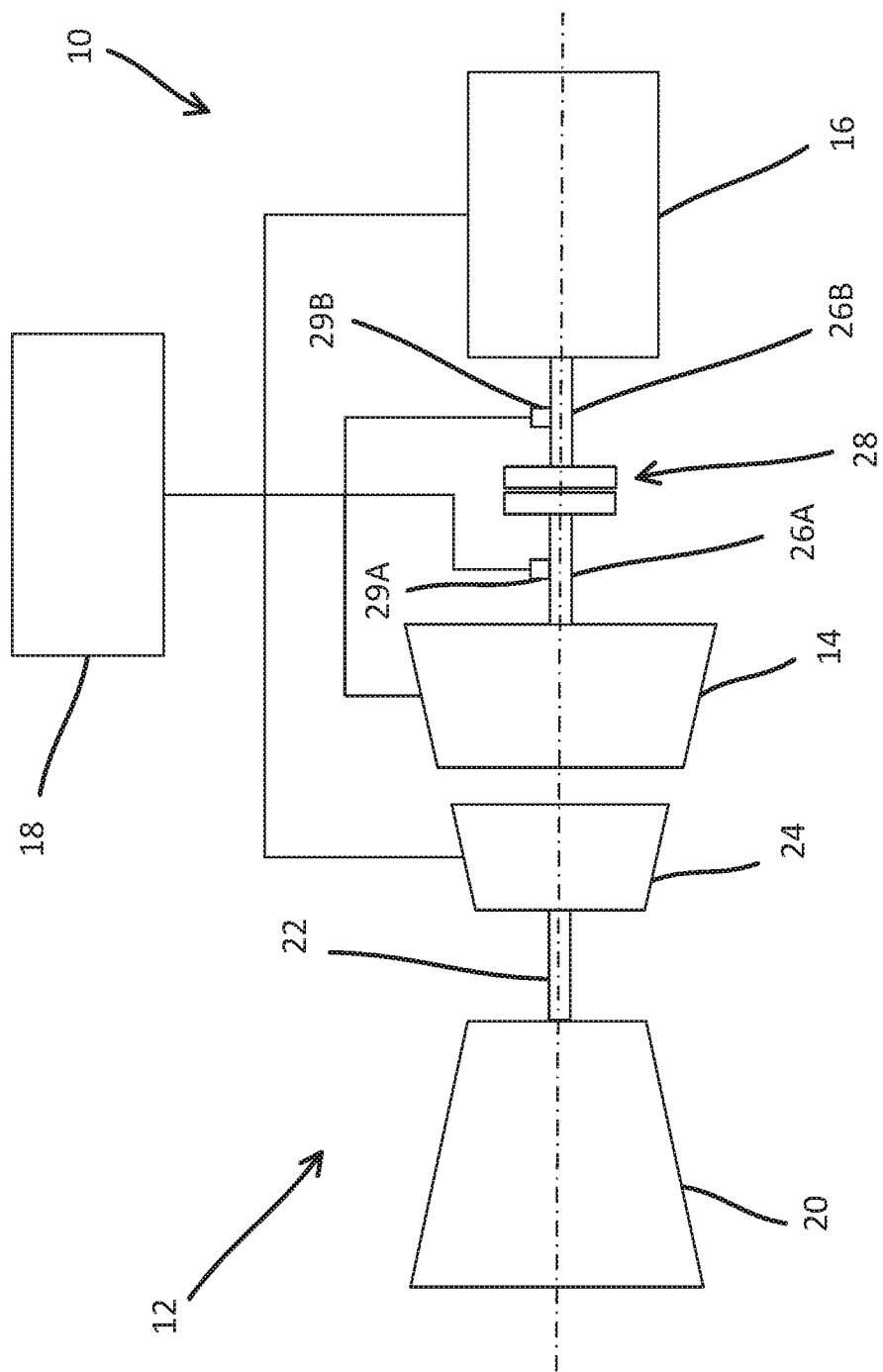
FIG. 1 is a schematic diagram of a gas turbine engine coupled to a generator-condenser via a clutch.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of power plant 10 comprising gas turbine engine 12, power turbine 14, generator-condenser 16 and controller 18. Gas turbine engine 12 can comprise compressor 20, shaft 22 and turbine 24. Power turbine 14 can be coupled to generator-condenser 16 via shaft 26A, clutch 28 and shaft 26B. Power turbine 14 can be connected to first speed sensor 29A and generator-condenser 16 can be connected to second speed sensor 29B.

Figure 2:
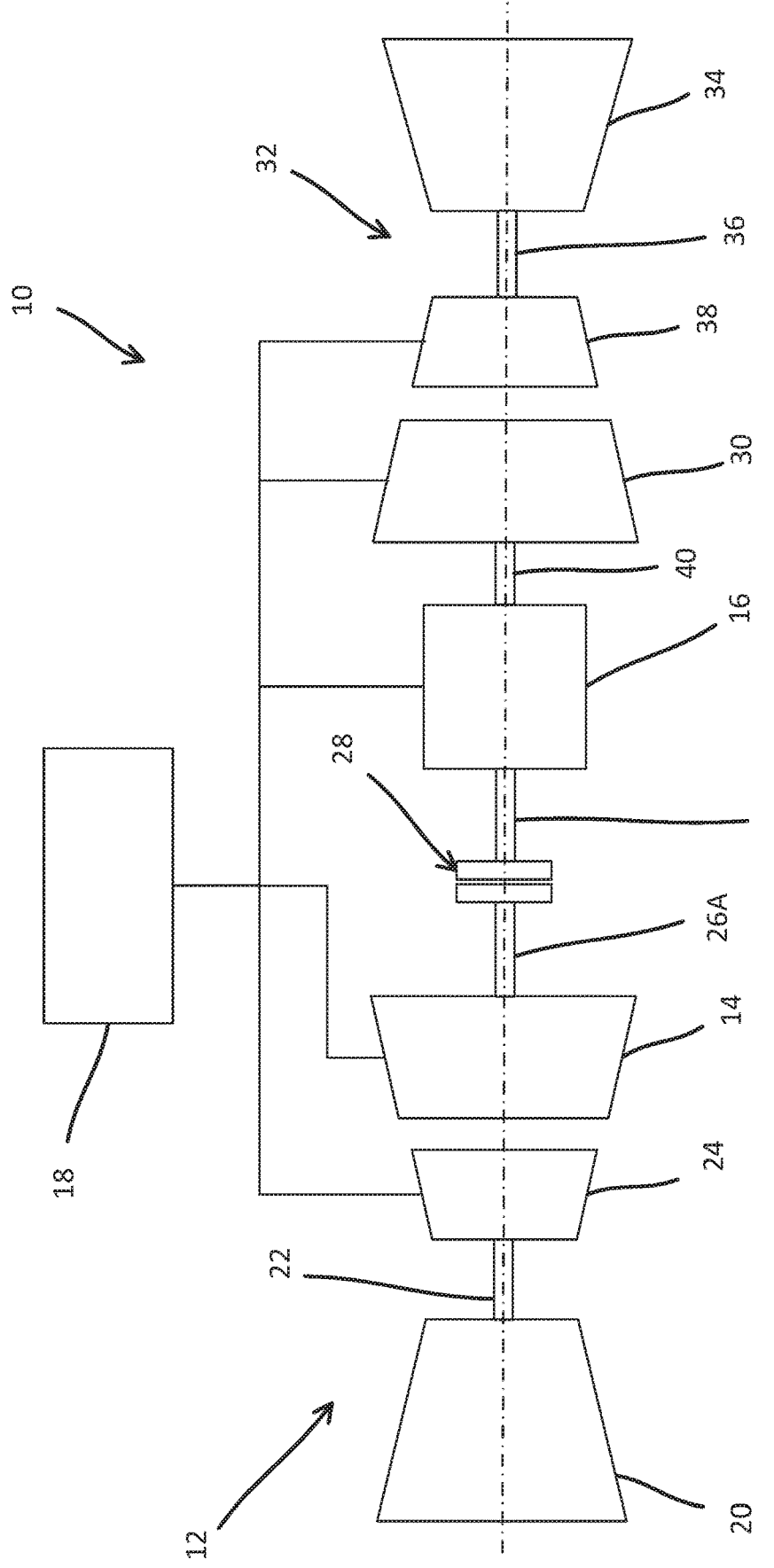
FIG. 2 is a schematic diagram of a gas turbine engine coupled to a generator-condenser via a clutch, wherein the generator-condenser is directly coupled to a second gas turbine engine.

FIG. 2 is a schematic diagram of power generation system 10 comprising first gas turbine engine 12, first power turbine 14, generator-condenser 16, controller 18, clutch 28, second power turbine 30 and second gas turbine engine 32. Second gas turbine engine 32 can comprise compressor 34, shaft 36 and turbine 38. Second power turbine 30 can be coupled to generator-condenser 16 via shaft 40.

Figure 3:
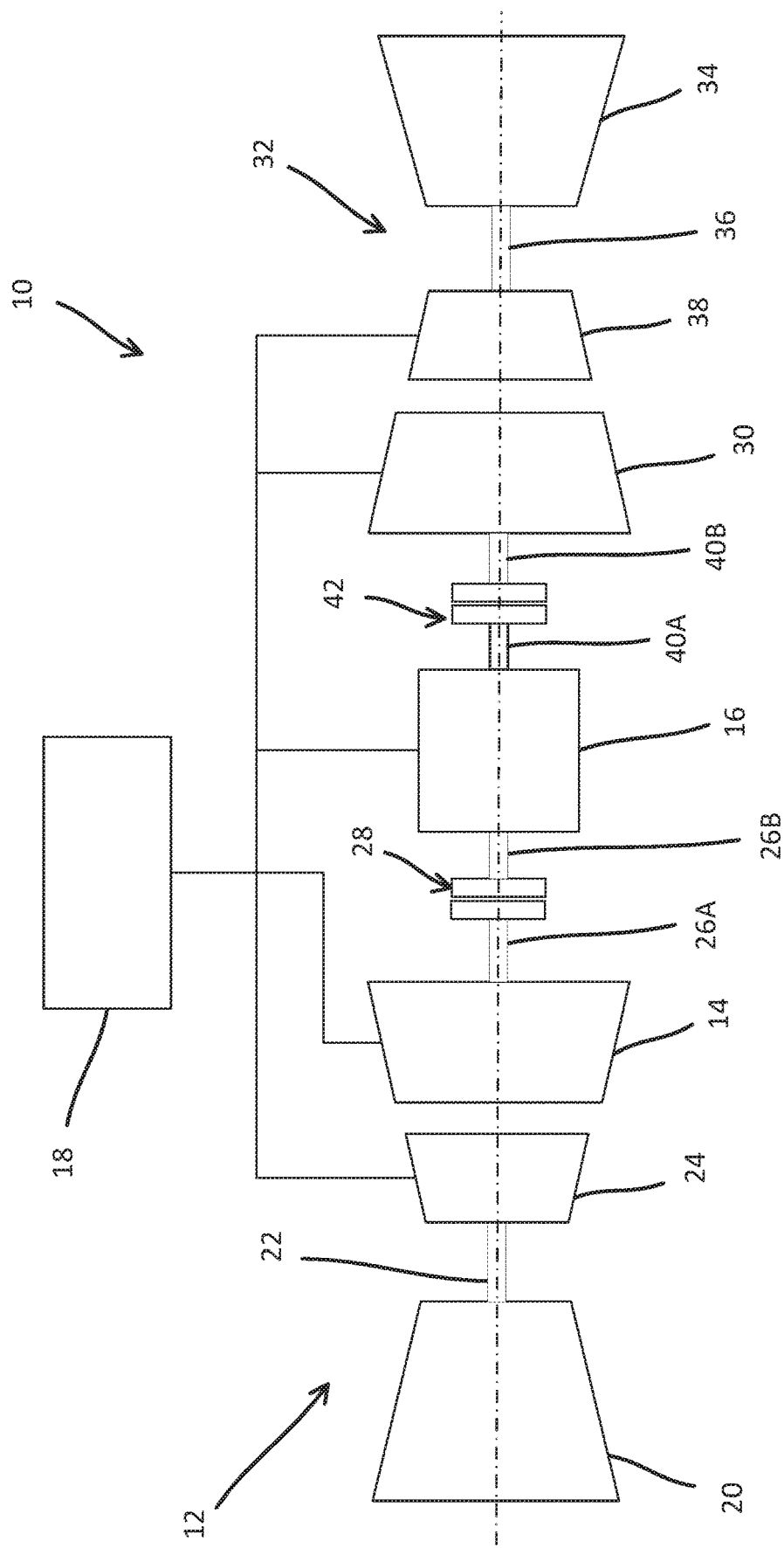
FIG. 3 is a schematic diagram of a gas turbine engine coupled to a generator-condenser via a clutch, wherein the generator-condenser is coupled to a second gas turbine engine via a second clutch.

FIG. 3 is a schematic diagram of power generation system 10 comprising first power turbine 14 and second power turbine 30 coupled to generator-condenser 16 via clutches 28 and 42, respectively.

First speed sensor 29A and second speed sensor 29B can be included in power generation system 10 of FIGS. 2 and 3, but are omitted for simplicity.

As shown in FIG. 1, power plant 10 can comprise a typical gas turbine power plant where exhaust from gas turbine engine 12 is used to drive power turbine 14, which drives generator-condenser 16 to produce electricity. Power turbine 14 can be in fluid communication with gas turbine engine 12 with no mechanical connection between turbine 24 and power turbine 14. As such, power turbine 14 can comprise a free turbine. Power turbine 14 can be mechanically connected to generator-condenser 16 via shafts 26A and 26B. In-line with shafts 26A and 26B, between power turbine 14 and generator-condenser 16, can be clutch 28. Clutch 28 can be a self-contained compact clutch, including an input end mechanically coupled to power turbine 14 via shaft 26A and an output end mechanically coupled to generator-condenser 16 via shaft 26B. There can be no other physical, electric, control, coolant, or lubricant connection to the self-contained compact clutch 28. That is, engagement of clutch 28 is purely determined by the relative speeds of shafts 26A and 26B.

Clutch 28 can be a self-engaging, overrunning clutch. In examples, clutch 28 can comprise one of a sprag, roller ramp, wrap spring and wedge style clutch. In response to the rotational speed of the input at shaft 26A being less than the rotational speed of the output at shaft 26B, clutch 28 can be automatically disengaged. In response to the rotational speed of the input at shaft 26A approaching and attaining the rotational speed of the output at shaft 26B, clutch 28 can be automatically engaged to couple together the input and the output at shafts 26A and 26B. Thus, as the speed of input shaft 26A increases, the speed of output shaft 26B will similarly increase.

If the rotational speed of power turbine 14 is less than the rotational speed of generator-condenser 16, clutch 28 can be disengaged, and generator-condenser 16 can spin freely relative to power turbine 14. For example, generator-condenser 16 can be driven as a condenser by power from the grid. As such, with the speed of generator-condenser 16 being greater than that of power turbine 14, operation of the clutch 28 allows the generator-condenser 16 to be capable of spinning without any impact or effect of the mass rotational inertia or aerodynamic drag of power turbine 14. That is, generator-condenser 16 can spin freely while power turbine 14 is stationary.

As the rotational speed of power turbine 14 approaches and becomes equal to the rotational speed of generator-condenser 16, such as when gas turbine engine 12 is activated by controller 18 to come on-line, clutch 28 can engage, and power turbine 14 can be coupled to generator-condenser 16. As such, power turbine 14 can transmit torque through clutch 28 to drive generator-condenser 16.

Various power plant configurations may employ such a clutch arrangement, such as synchronous condensing arrangements described and shown in reference to FIG. 1 and partial power arrangements shown in FIGS. 2 and 3.

In a synchronous condensing arrangement, in addition to generating real power to be delivered to the grid, generator-condenser 16 can perform as a synchronous condenser to generate or absorb reactive power from the grid, as will be appreciated by one of skill in the art. During operation in the synchronous condensing mode, there is no need to burn any fuel to operate gas turbine engine 12. In the absence of clutch 28, if generator-condenser 16 is connected to the grid, and rotating at the grid frequency, it will back-drive power turbine 14. The rotational inertia resulting from the mass of power turbine 14 can negatively impact the effectiveness and/or efficiency of operation of generator-condenser 16 as a synchronous condenser. Additionally, aerodynamic forces within power turbine 14 can be a drag upon generator-condenser 16 and further negatively impact the operation of generator-condenser 16 as a synchronous condenser. Use of clutch 28 alleviates such negative impacts upon the operation of generator-condenser 16 as a synchronous condenser, such as by alleviating the inertia and drag of power turbine 14.

As shown in FIG. 2, another arrangement is known as a partial power arrangement. In a partial power arrangement, two gas turbine engines, e.g., gas turbine engine 12 and gas turbine engine 32, and two power turbines, e.g., power turbine 14 and power turbine 30, are arranged and connected to one electric generator, generator-condenser 16. At least one clutch, e.g., clutch 28, can be provided between at least one power turbine, e.g., power turbine 14, and generator-condenser 16. In the example of FIG. 2, clutch 28 is positioned between power turbine 14 and generator-condenser 16. In additional configurations, clutch 42 (FIG. 3) can be positioned between power turbine 30 and generator-condenser 16 without the presence of clutch 28. Furthermore, as described with reference to FIG. 3, clutch 28 can be positioned between power turbine 14 and generator-condenser 16, and clutch 42 can be positioned between power turbine 30 and generator-condenser 16.

During operation, if the desired power output of power plant 10 is approximately equal to or less than the output of only one of gas turbine engines 12 and 32, power plant 10, via controller 18, can be operated in such a fashion to operate only one of gas turbine engines 12 and 32. Operation of one gas turbine engine will drive the associated power turbine, and in turn generator-condenser 16. Absent one of clutches 28 and 42, generator-condenser 16 will also drive the other power turbine, and the aerodynamic drag created by the other power turbine will reduce efficiency of power generation. Accordingly, use of one of clutches 28 and 42 to decouple the power turbine associated with the inactive gas turbine engine can increase the efficiency of power plant 10 when operating with one gas turbine. Use of clutches 28 and 42 can also be beneficial for maintenance purposes. For example, if one of gas turbine engines 12 and 32 is unavailable or inoperable, power plant 10 can operate without the need to physically decouple the unavailable gas turbine engine, or any capacity/efficiency decrement caused by parasitic drag of the power turbine associated with the unavailable gas turbine engine.

With reference to FIG. 3, it will be appreciated that it can be desirable within power plant 10 with two gas turbine engines 12 and 32 to utilize generator-condenser 16 as a synchronous condenser, as described with reference to FIG. 1. In such a case, it can be desirable to utilize both clutches 28 and 42 between generator-condenser 16 and power turbines 14 and 30, respectively, to let power generator-condenser 16 rotate independently, such as from grid power.

Typically, as described above, clutches used in various gas turbine power plants utilize various cooling and mounting systems to maintain the condition and longevity of the clutch, particularly due to shock loads associated with gas turbine engines ramping up and down to engage and disengage power turbines with a generator. As described above, clutches 28 and 42 of the present disclosure can be configured as compact clutches that are self-contained, and that include no external support, coolant, lubrication or controls. Accordingly, controller 18 can be configured to ensure that clutches 28 and 42 are protected from excessive torque and shock-loads and provide enhanced durability by controlling speeds of power turbines 14 and 30. In examples, controller 18 can modulate the fuel provided to (and thus power provided by) gas turbine engines 12 and 32 to protect clutches 28 and 42. In examples, if the speed of power turbines 14 or 30 is less than that of generator-condenser 16, controller 18 can maintain a specific ramp rate of the speed of power turbine 14 or 30 to protect clutches 28 and 42 so as to allow for gentle or low-impact engagement of clutches 28 and 42. For example, controller 18 can ramp up the speeds of gas turbine engines 12 and 32 at a rate, or a series of controlled ramp rates (such as a rapid ramp rate followed by a much slower engagement ramp rate) that is slow enough to avoid large shocks and torques being applied to clutches 28 and 42, e.g., by allowing the mechanisms of clutches 28 and 42 to engage at speeds within low-wear tolerance bands of clutches 28 and 42.

Figure 4:
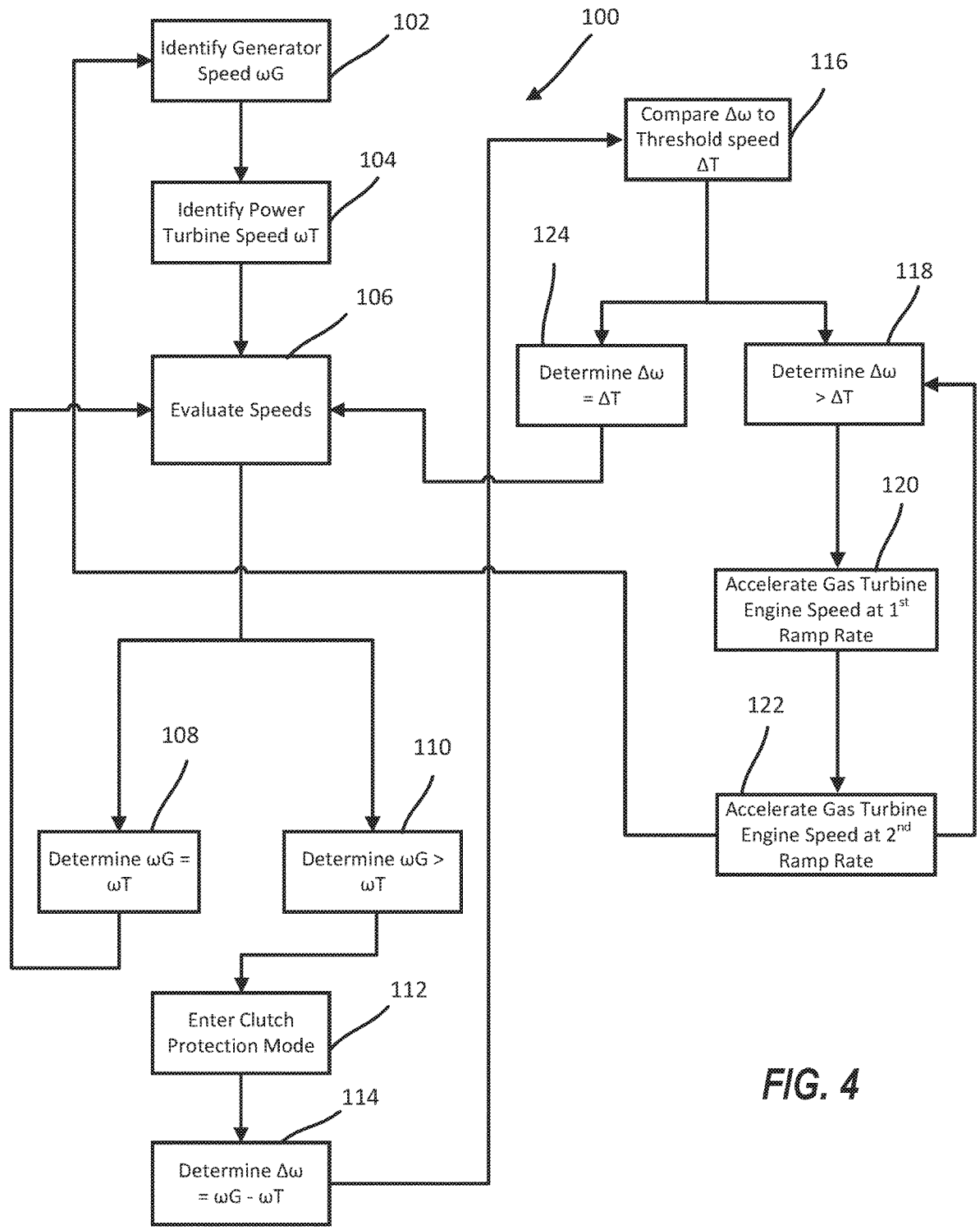
FIG. 4 is a line diagram illustrating a method for coupling a power turbine to a generator in a gas turbine power plant.

FIG. 4 is a line diagram illustrating method 100 for operating clutches 28 and 42 in power plant 10 according to the present disclosure. The speed of power turbines 14 or 30 can be less than that of generator-condenser 16 if power plant 10 is transitioning from operation as a synchronous condenser to provide real power to the grid, or if the partial power arrangement is transitioning from use of one of gas turbine engines 12 and 32 to two of gas turbine engines 12 and 32. In such cases, controller 18 can perform the following method to protect the clutch.

At step 102, controller 18 can identify the speed ωG of generator-condenser 16. At step 104, controller 18 can identify the speed ωT of power turbine 14 or power turbine 30. At step 106, controller 18 can evaluate the speed of generator-condenser 16 and power turbines 14 and 30.

At step 108, controller 18 can evaluate if the speed ωG of generator-condenser 16 is equal to the speed ωT of power turbines 14 and 30. If so, controller 18 can return to step 106 to continually monitor system speeds. In such a scenario, clutches 28 and/or 42 will already be engaged such that power turbines 14 and 30 are driving generator-condenser 16. Note, speed ωG of generator-condenser 16 will not be below that of speed ωT of power turbines 14 and 30 due to operation of clutches 28 and 42, absent extenuating circumstances such as malfunction or maintenance conditions.

At step 110, controller 18 can evaluate if the speed ωG of generator-condenser 16 is greater than the speed ωT of power turbines 14 and 30. If so, controller 18 can enter a "clutch protection" mode at step 112.

At step 114, controller 18 can determine the difference Δω between the speed ωG of generator-condenser 16 and the speed ωT of power turbine 14 or power turbine 30.

At step 116, controller 18 can compare difference Δω to a threshold speed difference ΔT. The threshold speed difference ΔT represents a speed difference threshold indicative that the power turbine 14 speed ωT is approaching the speed ωG of generator-condenser 16. That is, when Δω is equal to or less than ΔT, the rate of increase of speed ωT of power turbine 14 may be decreased in order to reduce any shock or impact associated with the engagement of clutches 28 or 42 to match the speed ωG of generator-condenser 16. However, if the speed ωT of power turbine 14 is significantly below the speed ωG of generator condenser 16 (e.g., difference Δω is large and greater than ΔT), such as below a rate at which generator-condenser 16 is desired to run to maintain a specific output, the rate of increase of speed ωT of power turbine 14 can be increased to shorten the time required for the speed ωT of power turbine 14 to approach and attain the speed of ωG of generator-condenser 16.

At step 118, if difference Δω is greater than threshold speed differential ΔT, controller 18 can control gas turbine engine 12 or 32 to ensure that the acceleration (or speed ramp rate) of power turbine 14 is no greater than a first maximum ramp rate, e.g., a ramp rate that brings power turbine 14 expediently and safely near the speed ωG of generator-condenser 16, at step 120.

At step 122, controller 118 can increase the speed of gas turbine engine 12 such that as the speed ωT of power turbine 14 or power turbine 30 approaches the speed ωG of generator-condenser 14 (and thus the difference in speed ΔT approaches the threshold value) gas turbine engine 12 will be controlled to reduce the acceleration of power turbine 14 such that it is no greater than a second maximum ramp rate less than the first maximum ramp rate. The second ramp rate can be, e.g., a ramp rate at which clutches 28 and 42 will bear no or little shock. That is, as the difference in speed is reduced to the point where the threshold value is attained, gas turbine engine 12 will be controlled to reduce acceleration of power turbine 14 to avoid excessive shock or torque loading upon clutch 28. After step 122, controller 18 can return to step 118 or step 102 as needed.

Consider as an example, if generator-condenser 16 is connected to the grid and operating as a synchronous condenser, rotating at a grid frequency of 3600 rpm, and a request is made for power plant 10 to generate real power. Gas turbine engine 10 will be started by controller 18, such as from a standstill (e.g., 0 rpm) and accordingly, mass flow of gas turbine engine 12 will initiate rotation of power turbine 14. If threshold speed difference ΔT is set for 200 rpm (e.g., 200 rpm below 3600 rpm), gas turbine engine 12 can be controlled to accelerate power turbine 14 up to a speed of approximately 3400 at a maximum acceleration rate of 100 rpm/sec. Upon reaching approximately 3400 rpm, the delivery of fuel to gas turbine engine 12 can be reduced to likewise reduce the acceleration rate of power turbine 14 to 20 rpm/sec until power turbine 14 attains 3600 rpm (the same speed as generator-condenser 16) and clutch 28 engages. From that point forward, another acceleration rate may be selected, or the clutch protection mode may be terminated.

In some embodiments the speed ωG of generator-condenser 16 can be directly measured, via rotational speed sensor 29B, such as a magnetic or optical based sensor, for example. In other embodiments, the speed ωG of generator-condenser 16 can be calculated or derived based upon the grid frequency (with the knowledge that when synchronized to the grid, generator-condenser 16 will rotate at the speed corresponding to grid frequency, as will be appreciated by one of skill in the art).

Figure 5:
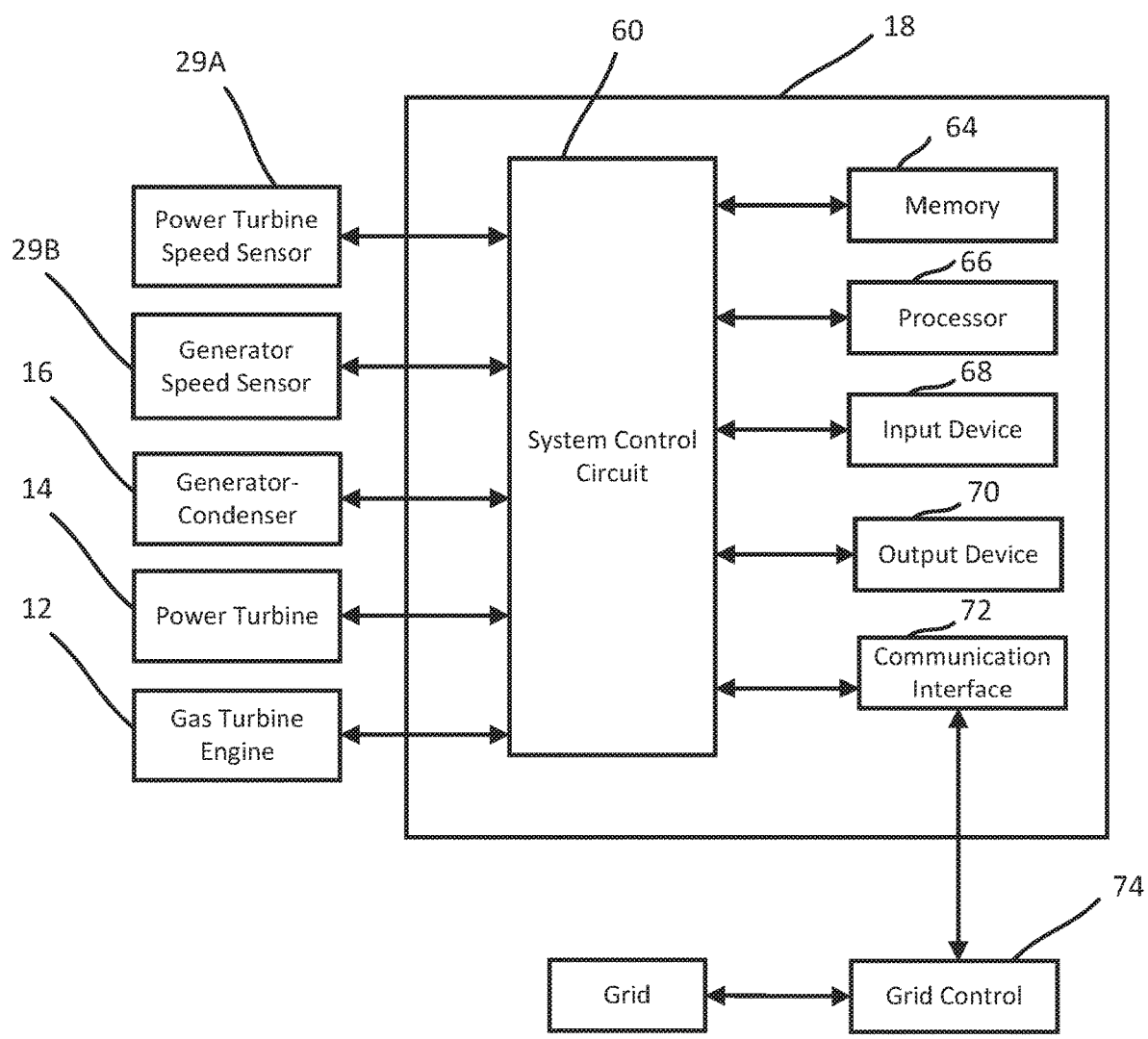
FIG. 5 is a schematic diagram illustrating a control system architecture for the power plants of FIGS. 1-4.

FIG. 5 is a schematic diagram illustrating components of controller 18 for gas turbine engines 12 and 32 of FIGS. 1-3 and with which method 100 of FIG. 4 can be executed. Controller 18 can include circuit 60, power supply 62, memory 64, processor 66, input device 68, output device 70 and communication interface 72. Controller 18 can be in communication with grid controller 74, which can provide power to end users via the electrical power grid. Controller 18 can also be in communication with gas turbine engines 12 and 32 and the various components thereof such as generator-condenser 16, power turbines 14 and 30, power turbine speed sensor 29A and generator speed sensor 29B.

Controller 18 can be configured to control the combustion process in combustors of gas turbine engines 12 and 32, which can alter the power output of the gas turbine engines to influence the speed of turbine shafts and the flow of exhaust gas to power turbines 14 and 30. To that end, controller 18 can be configured to operate one or more ignitors and fuel injectors, etc.

Controller 18 can include various computer system components that facilitate receiving and issuing electronic instructions, storing instructions, data and information, communicating with other devices, display devices, input devices, output devices and the like.

Circuit 60 can comprise any suitable computer architecture such as microprocessors, chips and the like that allow memory 64, processor 66, input device 68, output device 70 and communication interface 72 to operate together. Power supply 62 can comprise any suitable method for providing electrical power to controller 20, such as AC or DC power supplies. Memory 64 can comprise any suitable memory device, such as random access memory, read only memory, flash memory, magnetic memory and optical memory. Input device 68 can comprise a keyboard, mouse, pointer, touchscreen and other suitable devices for providing a user input or other input to circuit 60 or memory 64. Output device 70 can comprise a display monitor, a viewing screen, a touch screen, a printer, a projector, an audio speaker and the like. Communication interface 72 can comprise devices for allowing circuit 60 and controller 18 to receive information and transmit information to other computing devices, such as a modem, a router, an I/O interface, a bus, a local area network, a wide area network, the internet and the like.

Controller 18 can receive inputs from grid controller 74 to coordinate generation of power from power plant 10 based on demand from end users. Controller 74 can assign or instruct power plant 10 whether or not to be on-line and how much power output they should contribute to the grid.

Circuit 60 can communicate with, that is, read from and write to, a memory device such as memory 64. Memory 64 can include various computer readable instructions for implementing operation of power plant 10. Thus, memory 64 can include instructions for monitoring requests from grid controller 74. Memory 64 can include various computer readable instructions for implementing operation of power plant 10. Thus, memory 64 can include instructions for monitoring a power generation assignment from grid controller 74, instructions for power generation for gas turbine engines 12 and 32, start-up instructions (e.g., RPM ramp rates for rapid starts and clutch engagement speeds and associated instructions for components of gas turbine engines 12 and 32, such as ignitors and fuel injectors), the aforementioned first ramp rate and the second ramp rate, as well as other ramp rates, and the like. Memory 64 can include instructions for implementing the "Clutch Protection Mode" of FIG. 4, such as including instructions for calculating or otherwise determining speed $\omega G$ of generator-condenser 16, speed $\omega T$ of power turbine 14, threshold speed $\omega R$, and difference $\Delta \omega$.

The implementation of the aforementioned devices, systems and methods can allow for either one or a combination of the following:

1. Reduced implementation costs by eliminating cooling, lubricating and mounting components for the clutch;
2. Reduced clutch wear and tear;
3. Reduced maintenance costs for servicing cooling, lubricating and mounting components for the clutch;
4. Reduced maintenance costs for servicing one gas turbine engine in a partial power arrangement;
5. Reduced power plant down time for servicing; and
6. Improved times for bringing additional power on-line (e.g., efficient ramp rates).

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A gas turbine power plant comprising:
a first gas turbine;
a first power turbine fluidly connected to the first gas turbine, the first power turbine absent mechanical connection to the first gas turbine;
a first clutch having an input and output, the first clutch configured to disengage in response to a rotational speed of the input being less than a rotational speed of the output and to mechanically couple the input and output in response to the rotational speed of the input being equal to the rotational speed of the output, the input mechanically connected to the power turbine;
an electric generator mechanically connected to the output; and
a controller configured to:
identify that an instantaneous rotational speed of the electric generator is greater than an instantaneous rotational speed of the first power turbine;
determine a difference between the instantaneous rotational speed of the electric generator and the instantaneous rotational speed of the first power turbine;
in response to the difference being greater than a threshold, control the first gas turbine to a first maximum acceleration of the first power turbine; and
in response to the difference being equal or less than to the threshold, control the first gas turbine to a second maximum acceleration of the first power turbine, the second maximum acceleration less than the first maximum acceleration.

2. The gas turbine power plant of claim 1, wherein the electric generator is responsive to the controller to provide synchronous condenser functionality.

3. The gas turbine power plant of claim 1, further comprising a rotational speed sensor to measure the instantaneous rotational speed of the electric generator.

4. The gas turbine power plant of claim 1, wherein the controller is further configured to determine the instantaneous rotational speed of the electric generator via measurement of grid frequency.

5. The gas turbine power plant of claim 1, further comprising:
a second gas turbine; and
a second power turbine fluidly connected to the second gas turbine, the second power turbine absent mechanical connection to the second gas turbine, the second power turbine mechanically coupled to the electric generator.

6. The gas turbine power plant of claim 5, further comprising:
a second clutch having an input and output, the input of the second clutch coupled to the second power turbine, the second clutch configured to disengage in response to an instantaneous rotational speed of the second clutch input being less than an instantaneous rotational speed of the second clutch output and to mechanically couple the second clutch input and second clutch output in response to the instantaneous rotational speed of the second clutch input being equal to the instantaneous rotational speed of the second clutch output, the second clutch input mechanically connected to the power turbine and the second clutch output mechanically connected to the electric generator.

7. The gas turbine power plant of claim 6, where the controller is further configured to:
identify that the instantaneous rotational speed of the electric generator is greater than an instantaneous rotational speed of the second power turbine;
determine a difference between the instantaneous rotational speed of the electric generator and the second power turbine;
in response to the difference being greater than the threshold, control the second gas turbine to a third maximum acceleration of the second power turbine; and
in response to the difference being equal or less than to the threshold, control the second gas turbine to a fourth maximum acceleration of the second power turbine, the fourth maximum acceleration less than the third maximum acceleration.

8. The gas turbine power plant of claim 7, wherein:
the first and third maximum accelerations are equal; and
the second and fourth maximum accelerations are equal.

9. The gas turbine power plant of claim 1, wherein the first clutch is a self-contained compact clutch and comprises one of a sprag clutch, a roller ramp clutch, a wrap spring clutch and a wedge style clutch.

10. The gas turbine power plant of claim 1, further comprising a speed sensor for sensing a speed of the first power turbine.

11. The gas turbine power plant of claim 1, wherein the controller is further configured to:
identify the instantaneous rotational speed of the electric generator while the electrical generator is functioning as a condenser for an electrical grid;
identify the instantaneous rotational speed of the electrical generator while the first clutch is disengaged; and
in response to the difference being equal or less than to the threshold, control the first gas turbine to the second maximum acceleration of the first power turbine in order to engage the first clutch, the second maximum acceleration less than the first maximum acceleration.

12. A method for coupling a power turbine to a rotating generator in a gas turbine power plant, the method comprising:
operating the generator such that the generator is rotating at a generator speed;
operating a gas turbine engine to rotate a power turbine from a speed that is slower than the generator speed, the power turbine fluidly connected to and absent mechanical connection to the gas turbine engine;
identifying an instantaneous rotational speed of the generator;
identifying an instantaneous rotational speed of the power turbine;
determining a calculated difference between the generator speed and the power turbine speed;
comparing the calculated difference in speed to a difference threshold;
ramping up the power turbine speed by:

accelerating the gas turbine engine at a first maximum acceleration of the first power turbine if the difference is greater than the threshold; and accelerating the gas turbine engine at a second maximum acceleration of the first power turbine if the difference is equal to or less than the threshold, the second maximum acceleration less than the first maximum acceleration; and engaging a clutch configured to couple the power turbine and the generator, the clutch having an input and an output and being configured to disengage in response to a rotational speed of the input being less than a rotational speed of the output and to mechanically couple the input and output in response to the rotational speed of the input being equal to the rotational speed of the output, the input mechanically connected to the power turbine, the output mechanically coupled to an electric generator.

13. The method of claim 12, wherein the engaging a clutch comprises engaging a self-contained compact clutch.

14. The method of claim 13, wherein:
identifying the instantaneous rotational speed of the generator comprises sensing a rotational speed of the generator; and
identifying the instantaneous rotational speed of the power turbine comprises sensing a rotational speed of the power turbine.

15. The method of claim 12, wherein ramping up the power turbine speed comprises ramping up the gas turbine engine speed to provide fluid power to the power turbine.

16. The method of claim 15, wherein ramping up the power turbine speed comprises ramping up the power turbine speed at a first ramp rate suitable for safely accelerating the power turbine.

17. The method of claim 16, wherein ramping up the power turbine speed comprises ramping up the power turbine speed at a second ramp rate suitable for safely engaging the clutch, the second ramp rate lower than the first ramp rate.

18. The method of claim 12, wherein operating the gas turbine engine to rotate the power turbine from a speed that is slower than the generator speed comprises operating the gas turbine engine from a standstill while the generator is operating in a synchronous condensing mode.

19. The method of claim 18, wherein at standstill the power turbine is not spinning and producing drag or inertia.

20. The method of claim 12, wherein operating the gas turbine engine to rotate the power turbine from a speed that is slower than the generator speed comprises rotating the gas turbine engine from an off-line state to engage the generator already being driven by a second gas turbine engine.

* * * * *